United States Patent [19]

Van Lierop et al.

[11] Patent Number: 5,557,169

[45] Date of Patent: Sep. 17, 1996

[54] ELECTRIC LAMP WITH HIGH AND LOW MELTING POINT CURRENT SUPPLY CONDUCTOR

[75] Inventors: Franciscus H. Van Lierop; Mathias L. M. Tunissen, both of Eindhoven, Netherlands

[73] Assignee: U.S. Philips Corporation, New York, N.Y.

[21] Appl. No.: 335,512

[22] Filed: Nov. 4, 1994

[30] Foreign Application Priority Data

Nov. 9, 1993 [BE] Belgium .................. 09301235

[51] Int. Cl.⁶ .................................. H01J 17/18
[52] U.S. Cl. .................................. 313/623
[58] Field of Search ............... 313/623, 624, 313/625, 626, 631, 331, 332

[56] References Cited

U.S. PATENT DOCUMENTS 3,363,133  1/1968  Harris et al. .

5,424,609  6/1995  Geven et al. .................. 313/623

*Primary Examiner*—Sandra L. O'Shea
*Assistant Examiner*—Vip Patel
*Attorney, Agent, or Firm*—Brian J. Wieghaus

[57] ABSTRACT

An electric lamp includes a lamp vessel sealed in a gastight manner and having a wall of ceramic material. A current supply conductor is connected to an electric element arranged in the lamp vessel and issues to the exterior via a lead-through channel in the wall. The current supply conductor has a first part with a comparatively high and a second part with a comparatively low melting point, which parts form a welded joint with mutually facing ends. The first part merges into a narrowing end having a length L and having a circumference O at the transition, which length L is at least one tenth of the circumference O, while the end is embedded at least partly in the end of the second part. This induction has the advantage that the current supply conductor can be manufactured more efficiently and with less wastage.

4 Claims, 2 Drawing Sheets

ELECTRIC LAMP WITH HIGH AND LOW MELTING POINT CURRENT SUPPLY CONDUCTOR

BACKGROUND OF THE INVENTION

The invention relates to an electric lamp provided with a lamp vessel which is sealed in a gaslight manner and has a wall of ceramic material, at least one current supply conductor being connected to an electric element arranged in the lamp vessel, which current supply conductor issues from the lamp vessel to the exterior via a lead-through channel in the wall and comprises a first part with a comparatively high and a second part with a comparatively low melting point, which parts form a welded joint with mutually facing ends.

Such an electric lamp, a high-pressure discharge lamp, is known from U.S. Pat. No. 3,363,133. A wall of ceramic material is understood to mean in the present description and claims a wall made from a refractory material such as monocrystalline metal oxide, for example sapphire, polycrystalline metal oxide, for example translucent gastight aluminum oxide (DGA), yttrium-aluminum garnet (YAG) or yttrium oxide (YOX), or polycrystalline non-oxidic material such as aluminum nitride (A1N). In the known lamp, the wall of the lamp vessel is made of DGA. The lamp vessel constitutes a discharge vessel which encloses a discharge space provided with a filling comprising metal halides. The discharge vessel comprises a tubular part and disc-shaped end parts which close off the tubular part on either side. A current supply conductor issues from the discharge vessel to the exterior at either end through a lead-through channel in each of the end parts. The current supply conductors have a first part made of tungsten, with a melting point of 3680 K, to which a second part made of niobium, with a melting point of 2770 K, is welded. End portions of the first parts extending into the discharge space serve as a pair of electrodes and thus constitute the electric element.

A practical method of achieving a welded joint between the parts is by means of resistance welding (butt welding). The parts are each connected to a pole of a current source and then pressed against one another with their ends. The heat generation in the contact surface between the two parts causes the part with the lower melting point to melt, whereby a welded joint with the other part is created.

The lamp vessel of a lamp with a ceramic lamp vessel is formed by means of (pre)sintering prior to the provision and gaslight fastening of the current supply conductors. In general, the current supply conductor is passed through the lead-through channel with narrow fit, after which a melting-ceramic connection is provided between the lead-through channel and the current supply conductor so as to realise the required gaslight seal of the discharge vessel.

When the parts of the current supply conductor are welded together, a thickening often arises around the boundary between the parts, which prevents the current supply conductor fitting in the lead-through channel—or being passed through the channel. This leads to a comparatively high wastage of current supply conductors, which adversely affects the cost price. Mechanical removal of the thickened portion, such as by grinding, involves an elaborate additional operation.

The thickening may be counteracted in that the welding current is limited or cut off earlier. The wastage percentage is high in that case as well, however, because no reliable weld is achieved in many cases then.

SUMMARY OF THE INVENTION

The invention has for its object to provide a measure whereby an electric lamp of the kind mentioned in the opening paragraph can be manufactured with less wastage.

According to the invention, the electric lamp is for this purpose characterized in that the end of the first part has a torpedo shape and ends in a tip, which may or may not be flattened, which tip at a distance of 0.9 L to the transition has a further circumference O1 which is at most equal to half the circumference O.

A possible explanation of the comparatively low wastage figure in lamps according to the invention is the following. When the ends of the parts are pressed against one another during resistance welding, these ends initially share a comparatively small contact surface area with one another. Since the narrowing end of the first part ends in a cross-section of comparatively small diameter, in addition, the electrical resistance at the area of the weld to be formed is comparatively high. Thus a comparatively small welding current can suffice for melting material of the second part. As long as only little material has been melted, the parts still touch one another in a small contact area and the welding current traverses a cross-section of comparatively small diameter, so that the heat generation remains comparatively great. In proportion as the molten material of the second part flows farther over the end of the first part, the contact surface area and the surface area of smallest cross-section of the combination of pans increase. The heat generation thus decreases. This renders it comparatively easy to avoid that the molten material flows beyond the narrowing end and forms a thickened portion therewith. Wastage is counteracted thereby. Since the narrowing end of the first part is at least partly embedded in the end of the second part after the welded joint has been completed, the parts have a comparatively great, curved contact surface which provides a sturdy connection between the parts. This is favourable because the current supply conductor may be mechanically loaded during further steps in the manufacturing process. Mechanical loading may occur, for example, during transport and during mounting of the current supply conductors. The current supply conductor may also be subject to mechanical loads if a burr is provided therein for the purpose of positioning.

After the heat generation has decreased, some time elapses before the material of the second part has cooled down so far that it solidifies. During that time, the material will flow further over the end of the first part. If the length L of the narrowing end is less than one tenth of the circumference O, the welding process is not well controllable because it is difficult to adjust the welding current such that on the one hand the material of the second pan solidifies in time and on the other hand the end of the first pan becomes sufficiently embedded in material of the second part for obtaining a sturdy connection between the pans.

The welding process is not well controllable, also if the second pan is provided with a narrowing end, in the case in which the narrowing end of the first pan has a length L smaller than one tenth of the circumference O or a narrowing end is not present at the first part. In that case, there is also insufficient time for the material of the second part to solidify after the heat generation has decreased, or a decrease in the heat generation takes place too late.

It is noted that lamps with quartz glass lamp vessels are known from the literature, with current supply conductors composed from pans which were welded together. A gaslight sealing of the lamp vessel takes place in such lamps in that the quartz glass is pinched around the current supply conductors in the softened state, whereby the quartz glass adapts its shape to that of the current supply conductors.

A method is known from the literature for butt welding of rods, one of which rods is provided with a "pointed" end by means of cutting. During cutting, however, the end is pinched together so that the end assumes an enlarged diameter perpendicular to the direction in which the end was compressed, so that it projects outside the first part.

A favourable embodiment of the electric lamp according to the invention is characterized in that the end of the first part has a torpedo shape and ends in a tip, which may or may not be flattened, which end at a distance of 0.9 L to the transition with the first part has a further circumference O1 which is at most equal to half the circumference O. It was found in the manufacture of an electric lamp according to this embodiment that a current supply conductor is obtained with a circumference which has a very even shape, also at the area of the welded joint. This is particularly favourable for a good flow of the melting ceramic in the space between the current supply conductor and the lead-through channel. The measure thus contributes to the realisation of a good and reliable gastight seal.

The first part with its torpedo-shaped end is preferably obtained in that it is torn off from a wire. Alternatively, the first part may be obtained through cutting or sawing after which in a subsequent additional treatment, such as TIC welding, a torpedo-shaped end is formed. The second part may be obtained, for example, through cutting, sawing, or tearing. The current supply conductor may comprise, for example, a first part of tungsten or molybdenum and a second part of niobium or tantalum.

In a first embodiment of the lamp according to the invention, the electric element is formed by an incandescent body. The lamp vessel may be filled, for example, with a rare gas and a halide, for example, methyl bromide.

In a further embodiment of the lamp according to the invention, the lamp is a high-pressure discharge lamp in which the lamp vessel forms a discharge vessel which encloses a discharge space provided with an ionizable filling, while the electric element is formed by an electrode. The measure according to the invention is particularly favourable for high-pressure discharge lamps. A narrow fit of the current supply conductor is important in these lamps, in particular in metal halide lamps, in order to avoid filling ingredients amassing in the space left vacant by the current supply conductor in the lead-through channel. Amassing of filling ingredients in the space inside the lead-through channel may lead to deviations in the lamp properties. It may also lead to attacks on the melting ceramic.

Preferably, the current supply conductor of the electric lamp according to the invention is manufactured with the use of a first part which merges into a further end which is identical to the end of the first part embedded in the end of the second part. This has the advantage in lamp manufacture that it is not necessary for avoiding wastage that the first parts are fed to the production process pointing in a predetermined direction. This has the additional advantage during fastening of the electric element to the further end that a comparatively low current strength can suffice for resistance welding in order to fasten the electric element to the current supply conductor. The electric element may thus have a comparatively small diameter without melting during the welding process. A further advantage is that comparatively little material evaporates from the welding spot during welding. The evaporation of material during welding is disadvantageous because it usually condenses on the electrode. During lamp operation, the material condensed on the electrode may evaporate again and subsequently deposit on the discharge vessel wall, which leads to a lower light output.

BRIEF DESCRIPTION OF THE DRAWINGS

This and other aspects are explained in more detail with reference to a drawing of an electric lamp according to the invention, in which.

DETAILED DESCRIPTION OF THE REFERRED EMBODIMENTS

Figure 1A:
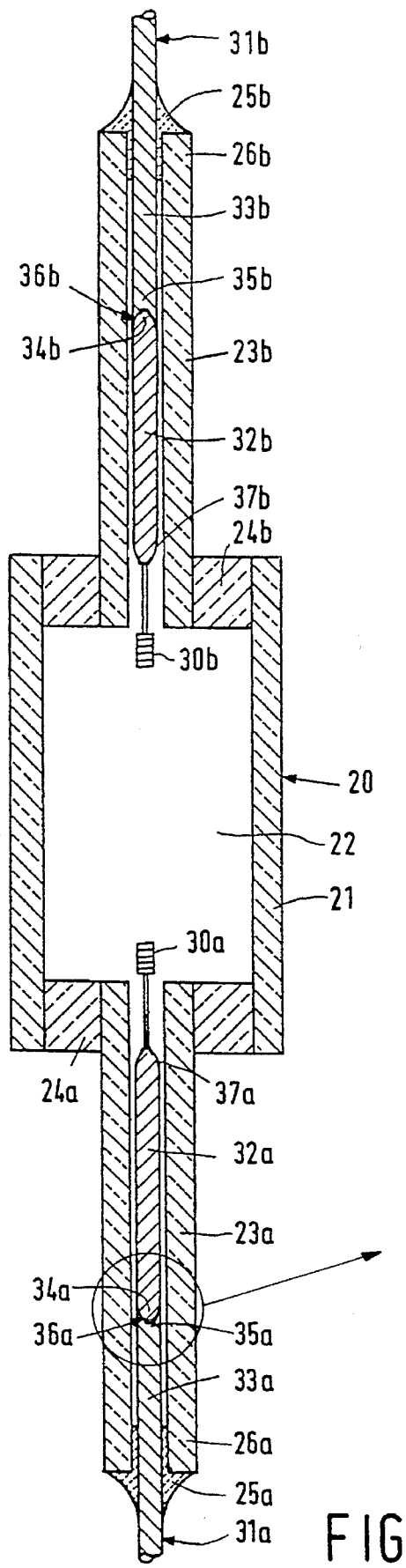
FIG. 1A is a longitudinal section of an end portion of an electric lamp in which the electric element in the lamp vessel is formed by a pair of electrodes.

FIG. 1A shows an electric lamp provided with a lamp vessel 20 with a wall 21 of DGA as the ceramic material. In the embodiment shown, the lamp is a high-pressure discharge lamp whose lamp vessel 20 forms a discharge vessel which encloses a discharge space 22, provided with an ionizable filling, in a gastight manner. The discharge space here has a filling of mercury and a mixture of halides, more in particular the metal halides sodium iodide, thallium iodide and dysprosium iodide. A first and a second electrode $30a,b$ are arranged in the discharge space 22 and connected to a first and a second current supply conductor $31a,b$. The current supply conductors $31a,b$ each issue to the exterior through a lead-through channel $23a,b$ in the wall. The lead-through channels $23a,b$ are constructed as tubes of ceramic material, in this case also DGA, which are sintered to ends $24a,b$ of the discharge vessel 20. The current supply conductors 3 $1a,b$ each comprise a first part $32a,b$ with a comparatively high melting point and a second part $33a,b$ with a comparatively low melting point. In the embodiment shown, the first part $32a,b$ is a molybdenum rod with a melting point of 2890 K, and the second part $33a,b$ is a niobium rod with a melting point of 2770 K. The first and second parts $32a,b$, $33a,b$ have diameters of 700 µm and 720 µm, respectively. The lead-through channel $23a,b$ has an internal diameter of 760 µm.

Figure 1B:
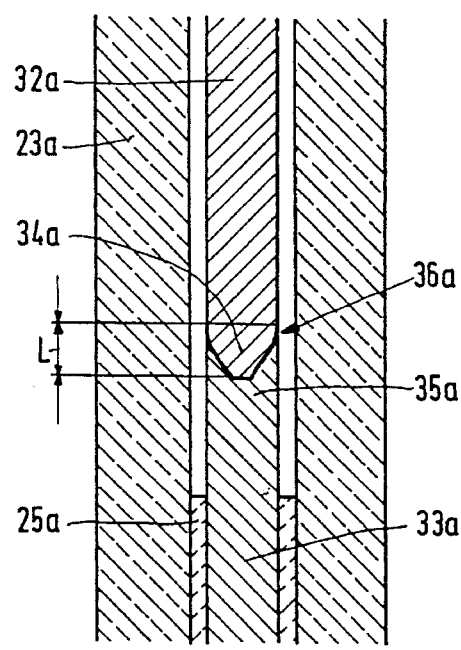
FIG. 1B shows a detail from FIG. 1A.

An end $34a,b$ of the first part $32a,b$ forms a welded joint $36a,b$ with an end $35a,b$ facing in that direction of the second part $33a,b$ (see also FIG. 1B). The current supply conductors $31a,b$ are fixed in the tubes $23a,b$ with melting ceramic $25a,b$, the melting ceramic $25a,b$ extending from the end $26a,b$ of the tube $23a,b$ facing away from the electrode $30a,b$ to approximately 1 mm before the welded joint $36a,b$.

The first part $32a,b$ merges into a narrowing end $34a,b$ with a length L of 500 µm. The end $34a,b$ has a circumference O of 2200 µm at the transition to the first part $32a,b$. The length L, accordingly, is at least one tenth of the circumference O. The end $34a,b$ is embedded substantially completely in the end $35a,b$ of the second part $33a,b$.

The narrowing end $34a,b$ has a torpedo shape and a flattened tip. The circumference O1 of the torpedo-shaped end is 817 µm at a distance of 0.9 L to the transition to the first part $32a,b$, which is less than half the circumference O.

Two hundred current supply conductors of this construction were manufactured. They were all sufficiently free from thickened portions in order to fit in the lead-through channel. The current supply conductors also showed an even circumference shape.

The first part 32a,b of the current supply conductor 31a,b also merges into a narrowing end 37a,b at a side remote from the second part 33a,b. The electrodes 30a,b are welded to this further end 37a,b of the first part 32a,b remote from the second part 33a,b. The electrodes 30a,b are constructed as tungsten rods with a diameter of 300 μm, each being provided with a winding at an end portion which points into the discharge space 22. For the manufacture of the current supply conductor 31a,b, a first part 32a,b was used whose further end 37a,b was identical to the end 34a,b of the first end 32a,b embedded in the end 35a,b of the second part 33a,b before the electrode 30a,b was welded to this further end.

It was concluded from research into forces occurring in practice during lamp manufacture that the bending strength of the welded joint must be at least 14.5 mNm. The bending strength was determined of six of the above current supply conductors. The second part was clamped in to just below the weld, and a radial force was exerted on the first part. It was measured at what moment the first part bent relative to the second part. It was found that the moment required for this was approximately 15.0 mNm.

For comparison, current supply conductors were manufactured of which the first part had a flat end or an end obtained by cutting. It was found that a substantial proportion of these current supply conductors, i.e. 20 to 50%, did not fit inside the lead-through channel. In many cases, moreover, no secure welded joint was found to be present. In those cases the current supply conductor already fell apart upon a negligible mechanical load, for example, during transport. The bending strength of the remaining current supply conductors was no more than 13.4 mNm.

Favourable results were also obtained with current supply conductors whose first part of molybdenum with a diameter D of 700 μm has a torpedo-shaped end with a length L of 350 μm. The circumference O of the torpedo-shaped end at the transition to the first part is 2200 μm. The circumference O1 of the torpedo-shaped end at a distance 0.9 L to the transition to the first part is approximately 940 μm. The second part, made of niobium, has a diameter of 720 μm.

Figure 2A:
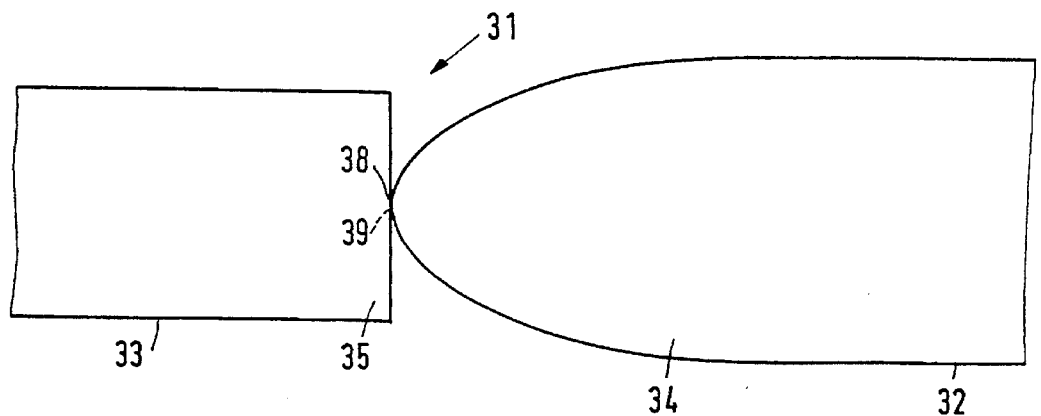
FIGS. 2A to 2C show the formation of a welded joint between the parts of the current supply conductor of the lamp of FIG. 1A.

FIG. 2A shows the first and the second part 32, 33 at the start of the welding operation. The parts 32, 33 have a comparatively small contact surface area 38 and a comparatively small area of a smallest cross-section 39, so that a comparatively high electrical resistance is created. The contact surface 38 and the smallest cross-section 39 have been indicated with a comparatively thick line and with a broken line, respectively given a certain predetermined welding current, a comparatively large quantity of heat is generated which causes the material of the second part to melt.

Figure 2B:
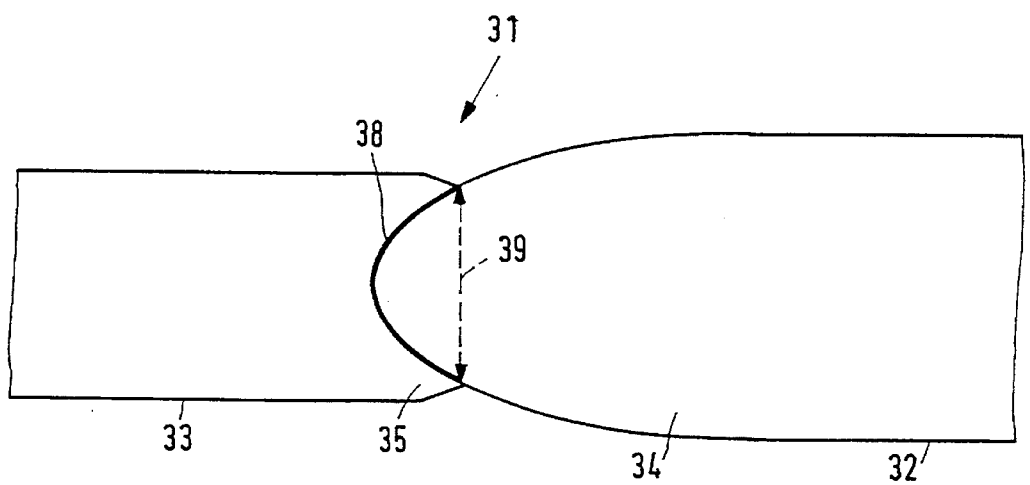

After some time the material of the second part 33 has spread over a portion of the narrowing end 34 of the first part 32 (see FIG. 2B). The contact surface area 38 and the area of smallest cross-section 39 have increased, so that the electrical resistance and thus the heat generation have decreased at a constant welding current.

Figure 2C:
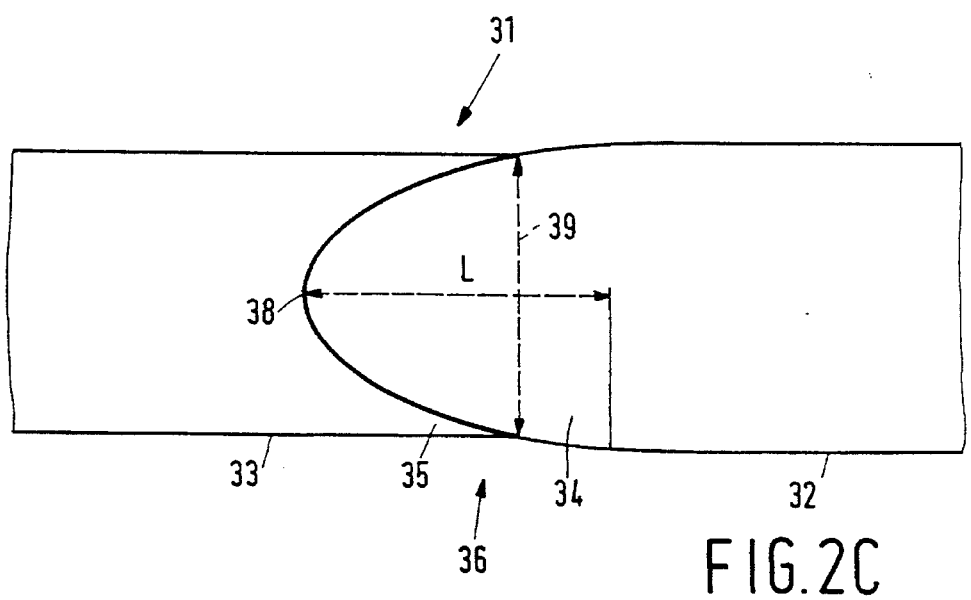

As shown in FIG. 2C, the narrowing end 34 of the first part 32 is embedded in the end 35 of the second part 33 facing the former after the weld has been completed. Since the heat generation decreases during welding, given a predetermined welding current, it is easy to avoid a thickening being formed around the weld. The parts 32, 33 have a comparatively large, curved contact surface 38 which provides a strong bond between the parts 32, 33.

We claim:

1. An electric lamp comprising a lamp vessel sealed in a gastight manner and having a wall of ceramic material with a lead-through channel, an electric element arranged in the lamp vessel, a current supply conductor connected to the electric element, which current supply conductor issues from the lamp vessel to the exterior via the lead-through channel in the wall and comprises a first part with a melting point and a second part with a melting point lower than the melting point of the first part, which first and second parts form a welded joint with mutually facing ends, characterized in that: the first part merges into a narrowing end, said narrowing end having a circumference O at the transition to the first part and a length L which is at least one tenth of the circumference O, and said narrowing end being at least partly embedded in the end of the second part.

2. An electric lamp as claimed in claim 1, characterized in that the end of the first part has a torpedo shape and ends in a tip, which is pointly or flattened, which tip at a distance to the transition of 0.9 L has a further circumference O1 which is at most equal to half the circumference O.

3. An electric lamp as claimed in claim 2, characterized in that the lamp is a high-pressure discharge lamp in which the lamp vessel forms a discharge vessel containing an ionizable filling, while the electric element is formed by an electrode.

4. An electric lamp as claimed in claim 1, characterized in that the lamp is a high-pressure discharge lamp in which the lamp vessel forms a discharge vessel containing an ionizable filling, while the electric element is formed by an electrode.

* * * * *